| United States Patent Office | 3,494,691 |
|---|---|
| | Patented Feb. 10, 1970 |

3,494,691
CONTROL DEVICE TO AUTOMATICALLY TAKE UP AND REWIND THE FILM IN A MOVING PICTURE DEVICE
Yoshihisa Katsuyama, Yokohama-shi, Japan, assignor to Nippon Kogaku K.K., Tokyo, Japan, a corporation of Japan
Filed Nov. 16, 1967, Ser. No. 683,582
Claims priority, application Japan, Nov. 22, 1966, 41/107,212
Int. Cl. C03b 23/00, 21/36, 1/00
U.S. Cl. 352—124         3 Claims

ABSTRACT OF THE DISCLOSURE

The invention provides a control device to automatically take up and rewind the film in a moving picture device by rotating a motor either in normal or in reverse direction, and enables the double exposure of the film smoothly by providing a rotatable member selectively rotatable in either direction in association with the movement of film take-up or rewinding, clutch means engageable with and disengageable from the rotatable member so as to transmit the driving movement of the film sending mechanism to or interrupt the same from the rotatable member, and operating means to rotate the motor either in normal direction when the film is fed or film is taken up for overlapping photography or in the reverse direction when the film is rewound for overlapping photography, and said clutch means transmitting the driving movement of the film sending mechanism to the rotatable member only when the film is taken up or rewound for the overlapping photography.

---

Among the film magazines for movie cameras, there are such magazines that a device for preventing the reversal rotation is provided on the core of a take-up reel, and in the movie cameras which employ such magazines as above, when the overlapping photography is done, first of all, the core of the take-up reel is substantially fixed and the primary exposure is carried out, and thus exposed film is loosely sent into a space provided within the take-up chamber of a magazine or between the film sending claw and the magazine, and then the exposed film is rewound into the supply-chamber, and thereafter the secondary exposure must be carried out.

In such movie cameras as above, there is a predetermined limit on the amount of film to be stored in the first stage, and when more than the predetermined amount of film is pushed therein, it causes trouble, and when the film is rewound more than the length of the film to be stored therein in the first stage, the perforation of the film is broken, and photography is made impossible.

The main object of the present invention is to provide a device which prevents and avoids such troublesome and unreasonable operations.

According to one feature of the present invention, an automatic control means is provided for taking up and rewinding the film in a moving picture device, such as a movie camera, the control means comprising a member rotatable from the original location to the other location to provide movement of the film in the take-up direction and rotatable to the opposite direction to provide movement of the film in the rewinding direction; stopping means engageable with the rotatable member to stop the movement of the film; clutch means engageable with and disengageable from the rotatable member so as to transmit the driving movement of the film sending mechanism to the rotatable member or to interrupt this transmission; operating means to switch electric circuit means to rotate the motor either in the normal direction in the film sending operation and the film take up operation for overlapping photography or in the reverse direction in the film rewinding operation for overlapping photography; and the clutch means transmitting said driving movement only when the film take-up and rewinding operations of the overlapping photography are made.

According to another feature of the invention, it is further provided with spring means to always bias the rotatable member to the direction to return it to its original location regardless of the direction of its movement from its original location and means interconnectable to the operating means for disengaging the clutch means from the rotatable member on the way of the operation from the taking up to the rewinding of the film so that the rotatable member can restore to its original location between the film take-up and rewinding operations so as to predetermine the amounts of the film to be taken up and rewound.

The above and other objects and features of the present invention will now be more apparent from the following description referring to an illustrative embodiment shown in the drawing in which.

Figure 1:
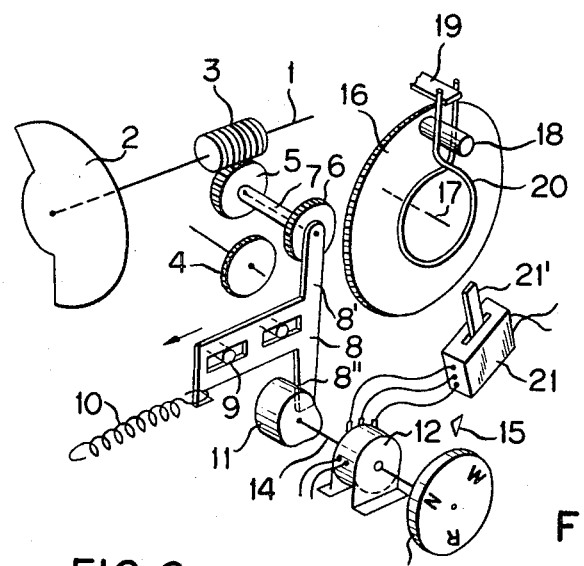
FIG. 1 is a schematic drawing showing an illustrative embodiment of the present invention.
Figure 2:
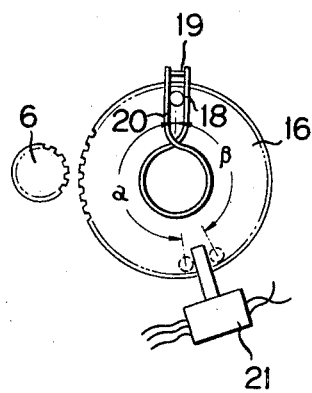
FIG. 2 is a plan view of a part of the embodiment shown in FIG. 1.
Figure 3:
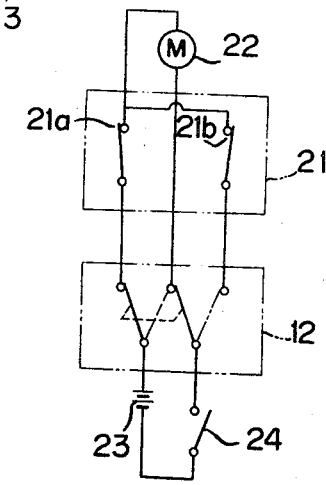
FIG. 3 is a circuit of a film driving mechanism according to the present invention.

In the drawing, 1 is a shutter shaft driven by a motor 22 which can be rotated in the normal as well as in the reversal direction, and the film sending claw (not shown) is operated by a conventional means, and the film is driven either in the take-up direction or in the rewinding direction; 2 and 3 are shutter blades and worm gear, respectively, fixed to the shaft 1; 4 is a take-up gear connected to the film taking up shaft (not shown) by the conventional means, 5 is a worm wheel which is always meshed with said worm gear 3; 6 is a clutch gear which can be selectively meshed with the take-up gear 4 or a scale gear 16. Said worm wheel 5 and the clutch gear 6 are arranged in such a manner that they can be rotated around a shaft 7 provided on a supporting arm 8' of a slidable plate 8, which is guided by pins 9 planted on the camera body so that it can be moved parallel with the axial direction of said shutter shaft 1, and is always enforced in the direction shown with an arrow in FIG. 1 by a spring 10; 11 is a cam; 12 is a switch which can be switched over in the normal as well as in the reversal direction, and a switching member is provided inside said switch 12; 13 is a switching dial having indicator notations N, W and R on the upper surface thereof as shown in FIG. 1, and the switching dial 13 is connected to the cam 11 and the switching member within the switch 12 through a shaft 14 so as to integrally rotate therewith. The shape of the cam 11 is determined such that, when the notation N of the switching dial 13 is adjusted to agree with a fixed mark 15, the cam 11 retreats the moving plate 8 to left side until the clutch gear engages with the take-up gear 4, and on the other hand, when the notations W or R is adjusted to agree with the fixed mark 15, the clutch gear 6 is moved to the right side by the cam 11 until it engages with the scale gear 16, and when the switch dial is rotated so that the fixed mark 15 is in a position intermediate of N and W, or W and R or R and N, the clutch gear 6 stops at a position where neither of the gear 4 nor gear 16 engages with the clutch gear 6 (FIG. 1). The switch pieces of the switch 12 actuate the motor 22 to rotate in the normal direction to take up the film when the mark 15 agrees to notation N or W (shown in solid line in FIG. 3), while the switch pieces actuate the motor 22 to rotate in the reverse direction to rewind the film when the mark 15 agrees to notation R (broken line in FIG. 3). The scale gear 16 is mounted on a shaft 17 rotatable in both directions and has a projected pin 18 planted on the front surface thereof. A setting piece 19 is provided on the fixed portion of the camera body for determining the standard position or the original location of the pin 18, and the width of the setting piece is made to be equal to or a little larger than the diameter of the pin 18; 20 is a twisted spring mounted on the periphery of said shaft 17, and as is shown in the drawing it is provided so as to pinch the connecting pin 18 and the piece 19 with both ends thereof; 21 is an automatically stopping switch whose operation-arm 21' is projected into the rotation trace of said pin 18, and when the operation-arm 21' is pushed from the left side with said pin 18, the contact 21a in the normal rotation circuit of the motor is opened, and when it is pushed from the right side the contact 21b in the reversal rotation circuit of the motor is opened. Thus, the rotational range of the connecting pin 18 is determined by the angle α or β from the standard position to the point where the connecting pin is contacted on either surface of the operation-arm 21' of the automatically stopping switch 21 and the position where said switch 21 is set against the standard position is determined such that the range of operation β of the connecting pin 18 in the reversal direction (the clockwise direction as is shown in the drawing) is equal to or a little smaller than the range of operation α in the normal direction (in the counter clockwise direction in the drawing). The motor circuit thus includes motor 22, battery 23, starting switch 24, the switch 12 and the stopping switch 21.

The following are the explanation relating to the operation of the embodiment.

IN CASE OF NORMAL PHOTOGRAPHY

When the switching dial 13 is rotated to adjust the notation N on the mark 15, the moving plate 8 is retreated and the clutch gear 6 is engaged with the take-up gear 4, and the switch 12 which is switchable in both directions, forms the normal direction circuit, and therefore when the starting switch 24 is closed in this state, the take-up shaft (not shown) for winding the film is rotated along with the shutter shaft 1 and the film sending claw which is interlocked thereto is rotated to take-up the film and the normal photography can be carried out.

IN CASE OF OVERLAPPING PHOTOGRAPHY

When the switching dial 13 is rotated to adjust the notation W on the indicator 15, the moving plate 8 is moved to the right, and the clutch gear 6 is engaged with the scale gear 16, and at the same time the switch 12 which is switchable in both directions still forms the normal direction circuit, and therefore when the starting switch 24 is closed in this state, the shutter shaft 1 and the film sending claw alone are operated in the normal direction, and the film is sent, but since the take-up shaft is stopped, the film is loosely stored in the take-up chamber of the magazine or in an appropriate portion of the space between the sending claw and the magazine. At this time, the scale gear 16 is also rotated in the normal direction (in the counter clockwise direction in the drawing), and therefore the connecting pin 18 is rotated in the same direction against the twisted spring 20, and at the terminal position of the range of operation angle α, the operation-arm 21' of the automatically stopping switch 21 is pushed, to open the contact 21a of the circuit for supplying electricity to rotate the motor 22 in the normal direction, and the movement of the film is stopped. Therefore, when the amount of the film stored arrives at a predetermined point by controlling the range of operation angle α, it is possible to stop the movement of the film automatically at said position.

Next, when the film is rewound, the dial 13 is to be rotated to adjust the notation R on the indicator 15, however, on the way of this rotation and when the intermediate position between the notations W and R agrees to the mark 15, the plate 18 retreats to its intermediate position to disengage the clutch gear 6 from the scale gear 16 and the scale gear 16 restores to its original location by the energy of the spring 20. As a result when the notation R of the dial 13 agrees to the mark 15, the clutch gear 6 engages with the scale gear 16 while the pin 18 is in its original or standard position. And at the same time the switch 12 switches to connect the motor 22 to the circuit for reverse rotation and consequently, when the starting switch 24 is closed in this state, the shutter shaft 1 and the film sending claw actuates to rewind the film and to rotate the scale gear 16 to the reversal direction (clockwise direction in the drawing). Therefore, the connecting pin 18 is rotated in the opposite direction against the direction of the film winding operation, and the connecting pin 18 pushes the automatically stopping switch 21 at the final position of the range of operation β to open the contact 21b of the circuit for supplying electricity to reversally rotate the motor, and to stop the rotation of the film, but since the operation range β of the connecting pin 18 in the opposite direction is determined to be equal to or a little smaller than the operation range α thereof in the normal direction, the amount of the rewound film is theoretically equal to the amount of the stored film, or a little smaller than the amount of the stored film. In other words, when the difference of the two operation ranges α and β is determined by taking into consideration the back-rush of the respective gears contained in the driving transmission system, or other factors, it is possible to prevent the breakage of the perforation of the film. When the rewinding operation is finished, the dial 13 is again rotated to adjust the notation N on the indicator 15, and the re-exposure for overlapping photography can be made. In this case the scale gear 16 can be turned back again to the standard state as mentioned above, and the explanation about it is omitted here.

In the embodiment as is shown in the drawing, when the transmission ratio of the transmission system from the shutter shaft to the scale gear 16 can be changed, it is possible to change the amount of scaling.

On the other hand, the automatically stopping switch 21 can be divided into two switches in view of operation, and when two connecting pins 18 are provided so as to correspond each of connecting pins to the respective separate type switches, the values of the respective operation ranges α and β can be appropriately changed.

In such embodiments as above, several sets of connecting pins and separate type switches may be provided so that the respective operation ranges can be changed stagewise by providing them stage by stage.

It is needless to mention here that the transmission system can be mechanically disconnected by placing clutch member in place of the automatically stopping switch.

It is needless to say that when the film is rewound, the camera lens can be covered with a cap in advance or the opening of the shutter should be closed.

As mentioned so far, when this invention is employed, it is possible to prevent troubles caused by the excess or lack of rotation in winding or in rewinding the film, and therefore this invention is very effectively employed in a movie-camera in which unrewindable magazine is used as discussed in the beginning of this specification.

What is claimed is:

1. In an automatic control means for taking up and rewinding a film in a moving picture device by rotating a motor in normal and reversal directions, respectively, an improvement resides in an arrangement comprising a member rotatable from an original location to other location by take-up operation for overlapping photograph or in the take-up direction and rotatable in the opposite direction in association with the movement of the film in the rewinding direction; stopping means to stop the movement of the film by engaging with said rotatable member; clutch means engageable with and disengageable from the rotatable member so as to transmit the driving movement of film sending mechanism to the rotatable member or to interrupt this transmission; operating means to switch electric circuit means to rotate the motor either in the normal direction in the film sending operation and the film take-up operation for overlapping photographyy or in the reverse direction in the film rewinding operation for overlapping photography; the clutch means transmitting the driving movement of the film sending mechanism to the rotatable member only when the film take up and rewinding operations of the overlapping photography are made.

2. In an automatic control means for taking up and rewinding a film in a moving picture device by rotating a motor in normal and reversal directions, respectively, an improvement resides in an arrangement comprising a member rotatable from an original location to other location in association with the movement of the film in the take-up direction and rotatable in the opposite direction in association with the movement of the film in the rewinding direction; stopping means to stop the movement of the film by engaging with said rotatable member; clutch means engageable with and disengageable from the rotatable member so as to transmit the driving movement of film sending mechanism to the rotatable member or to interrupt this transmission; spring means to always bias the rotatable member to the direction to return it to its original location regardless of the direction of its movement from the original location; operating means to switch electric circuit means to rotate the motor either in the normal direction in the film sending operation and the film take up operation for overlapping photography or in the reverse direction in the film rewinding operation for overlapping photography; means interconnectable to the operating means for disengaging the clutch means from the rotatable member on the way of the operation from film taking up to film rewinding so that the rotatable member restores to its original location between the film take up operation and the film rewinding operation for predetermining the amoutns of film to be taken up and rewound.

3. In an automatic control means for taking up and rewinding a film in a movie picture device by rotating a motor in normal and reversal directions, respectively, according to claim 2, in which the spring means, consists of a single spring member energizable in tow directions.

References Cited

UNITED STATES PATENTS

| | | | |
|---|---|---|---|
| 2,117,694 | 5/1938 | Becker | 352—217 |
| 2,955,510 | 10/1960 | Heinz | 352—124 |
| 3,246,944 | 4/1966 | Winkler | 352—91 |
| 3,425,776 | 2/1969 | Mayr et al. | |

JULIA E. COINER, Primary Examiner

U.S. Cl. X.R.

352—91, 173